United States Patent [19]

Todd, Jr.

[11] Patent Number: 5,073,396

[45] Date of Patent: * Dec. 17, 1991

[54] BEER FLAVORED WITH A NON-ACIDIC HOP-FLAVOR FRACTION

[75] Inventor: Paul H. Todd, Jr., Kalamazoo, Mich.

[73] Assignee: Kalamazoo Holdings, Inc., Kalamazoo, Mich.

[*] Notice: The portion of the term of this patent subsequent to Jul. 4, 2006 has been disclaimed.

[21] Appl. No.: 350,311

[22] Filed: May 11, 1989

Related U.S. Application Data

[63] Continuation of Ser. No. 833,231, Feb. 28, 1986, Pat. No. 4,844,939, which is a continuation-in-part of Ser. No. 584,525, Feb. 28, 1984, Pat. No. 4,666,731.

[51] Int. Cl.$^5$ ................................................ C12C 9/02
[52] U.S. Cl. ..................................... 426/592; 426/600
[58] Field of Search .......................... 426/16, 592, 600

[56] References Cited

U.S. PATENT DOCUMENTS

| | | |
|---|---|---|
| 2,652,333 | 9/1953 | Nelsson .................... 426/16 |
| 3,594,178 | 7/1971 | Meisler .................... 426/600 |
| 3,979,527 | 9/1976 | Laws ........................ 426/600 |
| 4,298,626 | 11/1982 | Laws ........................ 426/16 |
| 4,324,810 | 4/1982 | Goldstein ................. 426/16 |
| 4,338,348 | 7/1982 | Muller ...................... 426/600 |
| 4,590,296 | 5/1986 | Cowles et al. . |
| 4,640,841 | 2/1987 | Forster .................... 426/600 |
| 4,647,464 | 3/1987 | Todd ........................ 426/600 |
| 4,666,731 | 5/1987 | Todd ........................ 426/600 |
| 4,844,939 | 5/1989 | Todd . |
| 4,956,195 | 9/1990 | Todd ........................ 426/600 |

*Primary Examiner*—Carolyn Paden
*Attorney, Agent, or Firm*—Gordon W. Hueschen

[57] ABSTRACT

A beer flavored with a non-acidic hop-flavor fraction is disclosed. This hop fraction is made by extraction of hops and further treatment to provide an extract which is essentially devoid of alpha and beta acids.

2 Claims, No Drawings

BEER FLAVORED WITH A NON-ACIDIC HOP-FLAVOR FRACTION

This application is a continuation of my prior-filed copending application Ser. No. 833,231, filed Feb. 28, 1986, now U.S. Pat. No. 4,844,939, issued July 4, 1989, which in turn is a continuation-in-part of my prior-filed copending application Ser. No. 584,525, filed Feb. 28, 1984, now U.S. Pat. No. 4,666,731, issued May 19, 1987.

BACKGROUND OF THE INVENTION

1. Field of Invention

Hop extracts, constituents thereof, separation of the constituents thereof, $CO_2$ hop extracts, separation of the constituents thereof and utilization of the said constituents either as such or in the form of conversion products thereof in the flavoring of beer, avoidance of all artificial contaminants in the separation and employment of such $CO_2$ hop extracts. 2. Prior Art The art of using hops in beer has been changing over the last decades from the direct addition of hops to the wort during its boil, to the use of solvent extracts of hops and of hop pellets, to the use of preisomerized purified hop iso-alpha acids (isohumulones), and now to the use of carbon dioxide hop extracts.

Each state in the evolution of the art has achieved certain advantages:

1. The use of pellets and of organic solvent extracts permits the reduction of bulk and greatly increases the storage stability of the hop constituents by excluding the action of air. Pellets have the advantage of avoiding the use of artificial solvents, which are regarded as deleterious to the beer by some brewers, whereas the solvent extracts avoid the loss of wort due to absorption on the hops residues and the introduction of hop polyphenols into the beer with haze dangers. Both forms share the disadvantage of low utilization of the hops flavors in the brewing process. Organic solvents in common use in the extraction of hops are hexane, methylene chloride, and perhaps methanol. A disadvantage of the use of such solvents is the presumed inability to reduce their level to absolute zero in the beer in which they are used, even with state-of-the-art desolventization techniques.

2. Refined, preisomerized hop extracts are now available in the trade as solutions made according to various U.S. Patents, such as Westerman et al U.S. Pat. No. 3,448,326, 3,798,332, 3,965,188; Mitchell U.S. Pat. Nos. 3,949,092; and 3,973,052; and Todd U.S. Pat. Nos. 3,486,906 and 4,002,683.

These preparations enjoy the advantage over pellets and crude extracts in increasing the utilization of the hops two to three fold, in being completely stable in storage, and in being highly concentrated and reproducible. Compared to the present invention, they have certain inherent shortcomings, all of which are overcome by the present discovery:

a. All of these prior art preparations rely upon the use of organic solvents such as hexane, methylene chloride, benzene, methanol, butanol, etc., not only for the extraction of the hops, but also for the purification of the alpha acids (humulones) themselves. This is a disadvantage to the brewer who wishes to assert that his beer contains absolutely no solvent residues.

b. In all of the prior art processes referred to above, a non-bitter degradation product of isohumulones is formed at a 2% to 5% or more rate. It is called humulinic acid. This is because humulinic acid is readily formed by such degradation at the preferred pH range for isomerization in the prior art patent processes (10.7 and 12.0 in Mitchell U.S. Pat. No. 3,973,052 col. 5, 3rd para; 10.0 to 11 in Mitchell U.S. Pat. No. 3,949,092 col. 7, para 3; pH 12 in Westerman U.S. Pat. No. 3,558,326 col. 2, 1st para of example; pH 11.4 in Todd U.S. Pat. No. 4,002,683). A novel, unexpected, and critical aspect of the present invention is that the pH must and does drop during isomerization, so as to avoid the formation of humulinic acids, and it is also critical that the initial pH of the concentrated alpha acids be below about ten. Baker U.S. Pat. No. 4,247,483, col. 8, lines 16-18, states that the pH generally rises 1 to 2 points during isomerization. (In his Example 1, pH at start of isomerization is 9.82 and rises to 10.10 at end. Humulinic acid is present.)

c. Purification processes for the isohumulones are complex in the prior art. Westerman describes a series of partitions of aqueous and solvent phases to secure relatively pure isohumulones, with poor yields of the purified materials. Mitchell and Todd both depend upon acidification and reextraction into water, followed by reextraction into organic solvent. Baker's isohumulone is impure. The present invention eliminates all of these complexities, as well as the loss of yield.

3. To overcome the disadvantge of using artificial, organic solvents, the use of liquid and supercritical carbon dioxide for the extraction of hops has recently begun. This art is described in Kruger (Monatsschrift fur Brauerei, 33, Nr. 3), copy provided herewith. Although being more costly than conventional solvent extraction, a brewer using a $CO_2$ extract can claim that no solvent residues, even at the part per billion level, are present in the beer. This has certain obvious advantages in the promotion of a given brand. The utilization of carbon dioxide extracts used per se is not greater than that of pellets or of conventional extracts, however, although carbon dioxide extracts share the advantage of a hexane extract in eliminating hop polyphenols.

There is presently no known way of cleanly separating the alpha acids from the remainder of the $CO_2$ extract, or of isomerizing them, without the use of an artificial solvent or adsorption phenomena. This deficiency reduces the efficiency with which $CO_2$ extracts can be used to flavor beer directly, due to low utilization of the alpha acids during wort boil, and the aforesaid reluctance to employ an artificial solvent to improve this utilization and efficiency. The present invention overcomes both deficiencies.

Present art for the isomerization and separation of the constituents of carbon dioxide hop extracts either uses organic solvents or relies on adsorption/extraction processes (Lance U.S. Pat. No. 4,395,431 or Mueller—reference cited hereinafter), "salts out" impurities (Laws U.S. Pat. No. 4,298,626), or removes them by filtration using large amounts of adsorbent in dilute solution (Baker U.S. Pat. No. 4,247,183).

The present invention in its various forms overcomes all of these difficulties, as well as improves yields, and reduces or eliminates other manipulations.

THE PRESENT INVENTION

The advance in the art afforded by the present invention is to permit the carbon dioxide extract to gain the same increase in utilization which is achieved in a conventional solvent extract, and solvent refined and isomerized extract, without the use of any artificial or extraneous solvent and without the cumbersome, recovery-reducing procedure and cost of the processes described above in (2). Except for any added cost of the carbon dioxide extraction, therefore, the present invention permits the achievement of the same increased utilization as attained by refining and isomerizing conventional extracts. It further permits the utilization of the beta acids, usually discarded, in ways known to the art or alternatively by adding them as such to the wort for conversion to hulupones during the boiling thereof. It further allows the separation, without solvent and below boiling temperatures, of the non-acidic fraction of the hop extract which can be separately added to the wort, or used to late hop or dry hop the beer in the normal manner, thereby gaining control of the hop aromatic flavors in the brewing process independently of the bittering intensity and more reproducibly than can be effected according to the prior art, and without the use of artificial solvent.

The present advance in the art is possible by virtue of the discovery that carbon dioxide hop extracts may be separated or fractionated without the use of artificial solvents by stirring with an alkaline, e.g., sodium or potassium, hydroxide or carbonate solution of a concentration of one to fifteen percent, preferably three to fifteen percent, and advantageously six to eleven percent, within controlled pH ranges and employing not more than one equivalent of base, to secure an alpha acid fraction, a beta acid fraction, and a non-acidic fraction. No prior art reference shows or suggests this fractionation as a possibility. Furthermore, that the alpha acid fraction may be directly isomerized by the application of heat, using not more than one equivalent of base, without the formation of humulinic acid, and with a fall in pH, which is entirely novel to the present art. Alternatively, the alpha acids may be isomerized in the presence of the remainder of the hop extract, without the formation of impurities, again provided not more than about one equivalent of base is used. The beta acid fraction is accordingly also made available for conversion into other hop flavors, such as hulupones, or by reduction and/or isomerization to isoalpha acids and their tetra- and hexahydro derivatives.

OBJECTS OF THE INVENTION

It is an object of the invention to provide a method for permitting increased utilization of carbon dioxide hop extracts in the flavoring of beer without the employment of artificial contaminants, such as organic solvents or the like. Another object of the invention is to provide a simple and direct method for the separation of carbon dioxide hop extracts without the use of artificial solvents by a simple procedure which involves stirring of the extract with an alkaline, e.g., sodium or potassium, hydroxide, carbonate, or bicarbonate solution of specified concentration and within specified pH ranges, to cleanly produce an alpha acid fraction, a beta acid fraction, and a non-acidic fraction or, alternatively, an isohumulone fraction, a beta acid fraction, and a non-acidic resin fraction. An additional object of the invention is the provision of such process which also permits the direct isomerization of the alpha acid fraction by the application of heat, without formation of humulinic acid, and with an unpredictable but highly desirable drop in pH during the process, to which the, avoidance of humulinic acid formation can at least partially be attributed. A further object of the invention is to provide an alpha acid fraction, a beta acid fraction, and a non-acidic fraction, as produced by such separation procedure, and such an isomerized alpha acid fraction essentially devoid of humulinic acid as produced by such isomerization process, as well as procedure for converting these products into additional valuable flavoring ingredients, and the utilization of such flavoring ingredients or the said fractions themselves in the flavoring of beverages such as beer (including ale). An important object of the invention is the provision of such procedure and products which do not employ, and which are obtained without, the utilization of any materials which can be considered artificial contaminants, so that the products of the present invention and the procedures whereby they are obtained can in fact be considered to involve and contain only natural ingredients. A significant object of the invention is the provision of liquid, stable, alpha acid fractions in the form of an aqueous, single-phase liquid, containing sodium and/or potassium ions at a pH below about ten, and another significant object of the invention is the provision of a liquid, stable beta acid fraction as a single-phase aqueous solution, and a further substantial object of the invention is the provision of a tetrahydroalpha acid derived from a beta acid fraction by conversion thereof including hydrogenation thereof, and a still further substantial object of the invention is the provision of a tetrahydroisoalpha acid and a hexahydroisoalpha acid from a beta acid fraction by conversion thereof including hydrogenation, oxidation, and isomerization thereof. Additional objects of the invention will become apparent as the description proceeds, and still other objcts of the invention will be apparent to one skilled in the art.

SUMMARY OF THE INVENTION

The invention, in summary, comprises:

A process for separation of the components of a CO2 hop extract comprising the step of agitating the carbon dioxide hop extract together with a fractionation medium consisting essentially of aqueous alkali , said alkali being present in not more than an equimolar equivalent with respect to the alpha acid present in said extract, and without the necessity of employing any additional solvent, and separating the alpha acid fraction therefrom; such a process wherein the aqueous alkali is selected from the group consisting of sodium and potassium hydroxides, bicarbonates, and carbonates; such a process wherein the aqueous alkali is employed at a concentration of up to about fifteen percent; such a process wherein the aqueous alkali is employed at a concentration of between about six and about eleven percent; such a process wherein the fractionation mixture is heated during agitation; such a process wherein the fractionation mixture is heated to obtain a fluid fractionation mixture; such a process wherein the fractionation solvent additionally comprises up to about twenty-two percent by weight of an edible, water-miscible solvent selected from the group consisting of ethanol, propylene-glycol, and glycerine; such a process wherein the alpha acid fraction is first separated in the aqueous phase, the beta acid fraction then separated in an aqueous phase of substantially higher pH, and finally the non-acidic fraction is separated; such a process wherein the separated alpha acid fraction is subjected to isomerization in the form of the said separated aqueous alpha acid fraction in a concentration of above about fifteen percent at a temperature above about 60° C. until isomerization to isoalpha acids (isohumulones), at a starting pH no greater than about ten, and with not more than about one equivalent of base with respect to the alpha acid present, and during which isomerization the pH falls to a lower pH level, and in which the isomerization may be conducted in either the presence or absence of other hop resins and oils such as present in a total $CO_2$ hop extract; such a process wherein the concentration of alpha acid is at least about twenty percent; such a process wherein the temperature is preferably between about 60° C. and 130° C., and preferably wherein the starting pH is below about 9.5.

Also, an isohumulone produced by heating an alpha acid fraction, obtained from a CO2 hop extract by agitation with a fractionation medium consisting essentially of said aqueous alkali, by the application of heat at a starting pH not in excess of about ten, and with not more than about one equivalent of base with respect to the alpha acid present, preferably wherein the concentration of the aqueous alkali is not in excess of about fifteen percent, the concentration of the alpha acid in the isomerization step is above about fifteen percent, and the temperature during the isomerization is preferably not in excess of about 130° C.

Further, an alpha acid fraction produced from a CO2 hop extract by agitation of the same with a fractionation medium consisting essentially of said aqueous alkali and then removing the said alpha acid fraction.

Moreover, a beta acid fraction produced from a CO2 hop extract by agitation of the same with a fractionation medium consisting essentially of said aqueous alkali and removing the said alpha acid fraction.

In addition, a non-acidic hop-flavoring fraction produced from a CO2 hop extract by agitation of the same with a fractionation medium consisting essentially of said aqueous alkali and then removing the said alpha acid fraction and the said beta acid fraction.

Additionally, a process of producing an isohumulone which consists essentially of the step of heating an aqueous solution of alpha acid at a concentration of above about fifteen percent at a temperature above about 60° C. until isomerization of the alpha acid to isoalpha acid, the starting pH being no greater than about ten, and with not more than about one equivalent of base with respect to the alpha acid present, during which isomerization the pH falls to a lower pH level; especially such a process wherein the starting pH is below about 9.5; preferably wherein the temperature of the isomerization reaction is between about 60° C. and 120° C.

Further, an isohumulone produced by a process which consists essentially in heating an aqueous alpha acid solution at a starting pH not in excess of about ten, and with not more than about one equivalent of base with respect to the alpha acid present.

Moreover, a beer flavored with the aforesaid isoalpha acids or isohumulones, and a beer flavored with the aforesaid non-acidic hop flavoring fraction.

Also, an alpha acid composition consisting essentially of aqueous alpha acid, the alpha acid being present in a concentration of at least fifteen percent, having a pH below about ten when diluted in water, and containing an ion selected from the group consisting of sodium and potassium ions in not more than an equimolar equivalent with respect to the alpha acid, as well as a beta acid composition consisting essentially of aqueous beta acid, the beta acid being present in a concentration of at least twenty percent, having a pH above about ten when diluted in water, and containing an ion selected from the group consisting of sodium and potassium ions.

Finally, a tetrahydroalpha acid produced by a process comprising hydrogenation and oxidation of an aforesaid beta acid fraction, and a compound elected from the group consisting of a tetrahydroisoalpha acid and a hexahydroisoalpha acid, produced by a process comprising hydrogenation, oxidation, and isomerization of an aforesaid beta acid fraction, and an oily liquid mixture of soluble sodium isohumulates.

GENERAL DESCRIPTION OF THE INVENTION

The invention in general comprises a process for the separation of the components or constituents of a CO2 hop extract by agitating the same in the presence of an aqueous alkali, preferably sodium or potassium hydroxide or bicarbonate or the like, the said aqueous alkali being present in a concentration of preferably not greater than about fifteen percent, and with the application of heat where required or desirable to fluidize the fractionation mixture, in the presence of a fractionation medium consisting essentially of aqueous alkali, said alkali being present in not more than an equimolar equivalent with respect to the alpha acid present in said extract, and thereafter separating the components of the hop extract. Ordinarily, the alpha acids are separated first in the aqueous phase, then the beta acids in an aqueous phase of substantially higher pH, and finally the non-acidic fraction, which may include the hop oils if present in the starting hop extract. Edible solvents such as ethylalcohol, propyleneglycol, or glycerine can be present, but are not essential and are not a part of the preferred embodiment of the invention. The individual stable aqueous fractions of the alpha acids, the beta acids, and the non-acidic fraction are also included as a part of the invention. The beta acids may be converted to tetrahydroalpha acids, as well as the tetrahydro- and hexahydroisoalpha acids, in known manner and by the application of isomerization conditions, preferably heat alone, in the presence of not more than an equimolar equivalent with respect to the alpha acid, to produce the ultimate desired hydrogenated isoalpha acid. The non-acidic fraction may be used as such in the flavoring of beer in the usual manner. The separated alpha acid fraction may be subjected to isomerization by heat alone, in the presence of not more than an equimolar equivalent of alkali with respect to the alpha acid, to produce isoalpha acids (isohumulones) having improved bittering characteristics. During this isomerization, which should commence at a pH not in excess of about ten, the pH falls, eliminating production of undesirable humulinic acid. The temperature for the isomerization, which requires no more than heat alone, is preferably between about 60° C. and 130° C. Alternatively, the temperature may be greater than 130° C., but the time-temperature relationship such that undesirable decomposition does not occur. Accordingly, a temperature of 150° C. for a short time, say five or ten minutes, or even flash isomerization at higher temperatures, may be employed and is within the skill of one skilled in the art. Conversions of the separated alpha acid fraction to isoalpha or isohumulone fraction are attained at high starting alpha acid concentrations, usually at least fifteen percent and generally at least twenty or twenty-five percent, and yields of isomerized product are high. A preferred embodiment of the invention involves the two-step process of fractional separation of the alpha acids from the CO2 extract and subsequent employment of the aqueous alpha acid fraction in the isomerization by heat, in the presence of not more than an equimolar equivalent of alkali with respect to the alpha acid, to the isoalpha acid or isohumulone fraction. Alternatively, the alpha acid fraction may be isomerized in the presence of the other portions of the $CO_2$ hop extract, provided that not more than about one equivalent of base is present, and the starting pH is not greater than about ten, and if desired subsequently separated as an isohumulone fraction. All of this is accomplished without the necessity of usual synthetic or unnatural solvent contaminants or other unnatural conditions.

DETAILED DESCRIPTION OF THE INVENTION

The following preparations and examples are given by way of illustration only, and are not to be construed as limiting.

EXAMPLE 1

Separation of the Constituents of a CO2 Extract.

A. Separation

First, 14.5 gms. of CO2 hop extract (Kruger, loc. cit.) containing all the CO2-extracted hop ingredients or constituents, was warmed to 60° C. to make it fluid, and nine (9) ml of 10% KOH (0.94E of alpha) were added over a five-minute period with good agitation. The lower liquid phase, which had a pH of 8.6, was separated. It contained substantially all of the alpha acids, and only a trace of the beta acids present in the hop extract.

The supernatant hop extract was then further mixed, at 60° C., with five (5) ml of 10% KOH, whereafter the beta acid fraction was removed from the supernatant non-acidic resin, which had no significant amount of beta acids remaining therein. The beta acid fraction formed a stable single-phase solution when added to water.

B. Alpha-Acid Utilization

In a preferred embodiment of this invention, the separated alpha acids (having a pH of about 9.5) are thereafter isomerized by heating (100° C. for three hours, or less time at higher temperatures) accompanied by a drop in the pH, in this example to 6.5 at the end of the isomerization. The drop in pH is due to the less than equimolar amount of alkali, as contrasted to the substantial excess of sodium or potassium ions in Mitchell, Todd, Baker, and Laws. Baker (col. 8, lines 16-18) states that the pH generally rises 1-2 points during the isomerization, which is in marked contrast with this Example and invention, where the pH drops as much as three (3) points or more. This drop in pH is crucial to this invention, as it safeguards the purity of the isohumulones from degradation into humulinic acids or further degradation products, such as dehydrohumulinic acids, which are know to be harmful to beer. Following fermentation, the isohumulones are added to beer in accordance with procedures known to the present art.

C. Non-Acidic Fraction Utilization

The non-acidic resins, remaining after removal of the beta acids, may be added to the wort during boil, to contribute a characteristic hoppy aroma to the beer.

D. Beta-Acids Utilization

The separated beta acids are then available for transformation into hulupones according to U.S. Pat. Nos. 3,977,953, 4,013,721, and 4,340,763, or into tetrahydro alpha acids, which can be further transformed into tetrahydro and hexahydro isoalpha acids according to U.S. Pat. Nos. 3,552,975 and 3,923,897.

EXAMPLE 2

Manufacture of Isoalpha Acids from Alpha Acids. (Variant of Example 1B.)

The alpha acids, separated as in Example 1, but using base, were isomerized by autoclaving 2¼ hours at 120° C. No humulinic acid was detected in the isomerization products using either NaOH (0.82 equivalents) or KOH (0.74 equivalents). This Example portrays the efficacy of this technique for both isomerization and avoidance of by-product formation under stringent conditions. In both cases the pH fell from about 8.5 to 6.8. Concentrations of the humulones were 33% for the sodium oil and 55% for the potassium oil, showing also the variability and intensity of concentration which enables the invention to be used readily on a commercial basis.

The unexpectedly low pH range of 6.4 to 6.8, at the end of isomerization, which appears to be due to less than equimolar amounts of base being used, is the key to the avoidance of humulinic acid formation. The prior art uses always more than one equivalent of base, and preferably four to forty equivalents of base even if the pH is buffered at 9.8 by the use of carbonate (Example 1, Baker U.S. Pat. No. 4,247,483 and Example 1, Laws U.S. Pat. No. 4,298,626, respectively). Furthermore, the art describes isomerization by boiling in a dilute solution in water at a pH of 10.8, as well as by catalytic isomerization (U.S. Pat. Nos. 4,002,683 and 3,875,316). By-products in the present procedure are negligible, and it is a preferred embodiment of the isomerization process, and new to the art.

The equivalents of base can be as high as 0.98 in this invention, but it is preferable if they are no higher than about 0.85, to permit room for error in commercial practice. This means that the pH of the single-phase alpha liquid, when measured directly, should be preferably below ten, and optimally below about 9.5, and conveniently as low as 8.5.

The use of temperatures in excess of 100° C. is possible in this invention, inasmuch as degradation products are not formed, due to the aforesaid drop in pH. Likewise, the temperature of heating can be as low as 60° C. if sufficient time is available, or it can be at least as high as 130° C. if the time is shortened. A temperature of 100° C. to 110° C., under slight steam pressure, is a convenient commercial range, but not limiting.

Because only heat is used to isomerize, these isoalpha acids are clearly made in a natural manner, which is of great advantage to the brewer.

The present procedure for isomerization is an obvious improvement upon that of Mueller (Deutsche Auslegeschrift 2920765 as cited in Kruger para 4.2). Mueller isomerizes the CO2-extracted alpha acids by complexing them with calcium and/or magnesium ions present in bentonite, then effects isomerization with heat, and removes the CO2-soluble hop resins from the bentonite by extraction thereof, leaving the isoalpha acids adsorbed on the bentonite. Not only does this require the expense of a double CO2 extraction (first the hops, then the bentonite), but it also means that the utilization of the isohumulones is inherently poor, because they are not readily desorbed when the bentonite is added into the beer. It is therefore clear that the present invention overcomes the difficulties of the Mueller technique for isomerization, and without the use of bentonite or artificial solvents.

EXAMPLE 3

Further Variation Employing Sodium Hydroxide.

(1) Fifteen (15) gms. of CO2 extract, containing about 20% hop oil and 60% alpha acids, was fluid at room temperature. The extract was titrated to a pH of 9.8 with 13% NaOH, requiring 5.5 ml. The lower aqueous alpha acid fraction was separated out and was a single-phase liquid at room temperature at this pH. It weighed 14.5 grams. It contained essentially alpha acids with some beta acids by spectrophotometric assay.

(2) The alpha acid fraction was then converted by heat to isoalpha acids. In this case, it was heated under 15 lbs. steam pressure for two hours, and upon completion of the reaction was an oily aqueous liquid mixture of soluble sodium isohumulates which, when added to water, had a pH of 6.75.

(3) The extract phase from the first step was then further titrated to pH 10.2 with 0.6 ml of 13% NaOH, and a single-phase aqueous fraction of 2.74 gms having this pH and containing only a trace of alpha acids and 44% beta acids was removed.

(4) The remaining resin was further titrated with 1.4 ml of 13% NaOH to a pH of 13.2, and the last of the beta acid aqueous solution was recovered (1.68 gms, pH 13.2) from the non-acidic hop extract, including the oil, which remained.

Alternatively, if the titration of the alpha acid fraction is effected with only 4.5 ml of NaOH, the quantity of beta acids is substantially eliminated in the first fraction, as is the quantity of beta in the isoalpha fraction (derived according to Examples 1B and 2, or Step 2 hereof).

The alpha acid, the mixed alpha acid, and the beta acid fractions are suitable for addition to wort per se. Alternatively, they can be acidified and added to wort in their acid form, or they can be used for the preparation of isoalpha acids or beta acid derivatives.

One of the unexpected results of this invention over the prior art is that sodium can be substituted for the potassium used in Mitchell U.S. Pat. No. 3,973,052, which is obviously dependent upon the recognized superiority of potassium over sodium salts in solubility.

This invention has, therefore, as one of its objectives, the making of soluble sodium isohumulates, such as prepared in the present Example. It also has as another objective the preparation of liquid, stable, alpha acid fractions in the form of an aqueous, single-phase liquid, containing sodium (Example 3) and/or potassium ions (Example 1) at a pH below ten. A further objective is the provision of a liquid, stable beta acid fraction as a single-phase aqueous solution (Example 3, Example 1A).

EXAMPLE 4

Improved Separation of Alpha Acids and Isomerization Thereof.

Fifteen (15) gms. of CO2 extract of about 15% hop oil concentration were agitated at 40° C. with the addition of 7% KOH. When the pH electrode, by direct reading, reached 8.65, which required 14.5 ml of KOH (0.88 equivalent), the agitation was stopped and the lower aqueous solution of alpha acids separated.

Four (4) ml of KOH was then added to the remaining extract phase to separate the beta acids from the non-acidic fraction.

The aqueous alpha acid fraction had a concentration of approximately 34%, weighed 21.9 gms., was stable, and did not separate on standing. Upon retorting at 120° C. for two hours, the alpha acid fraction was converted to isoalpha acids which were in the form of a single-phase solution.

This Example demonstrates that there is a range of non-critical limits to the invention, which permit the separation of alpha acids and beta acids from a hop resin, in the absence of solvents, using an alkali metal solution of sufficient concentration, e.g., three to fifteen percent, preferably above five percent, and for practical purposes between about five and fifteen percent. Approximately six to eleven percent is advantageous, since it assists in the separation of beta acids from alpha acids and provides a fluid solution at ambient temperatures. The aqueous alpha acid and beta acid solutions are surprisingly stable for long periods of time at ambient temperatures in either their sodium or potassium forms at a pH below 10 for alpha acid and above ten for beta.

This Example moreover demonstrates the remarkable efficiency of this method in separating alpha acids from beta acids and other hop resins, which is superior to those reported in the patents referred to in the specification in several respects. In particular, essentially all of the alpha acids are separated at a pH of 8.65, which is substantially below the pH of Mitchell 3,973,052 or 3,949,092 (10.7 to 12 in former, see col. 5; and 9 to 9.2 in latter, see col. 5). In the former patent, Mitchell repurifies his alkaline extract, which is not required in the present case; in the latter patent Mitchell employs less than 5% and preferably less than 3% alkali to achieve a reasonable separation.

In both patents, the preferred range for boiling and isomerization is 10 to 11, whereas in the present case it is significantly lower, thereby to avoid humulinic acid formation. Obviously, employing the less pure preparations made by such previous procedures as those of Mitchell, a higher pH was required for isomerization to take place, so that an unexpected and beneficial aspect of the present invention is therefore that isomerization can be caused to occur rapidly and cleanly at a pH below about 10.

Furthermore, Baker does not separate the alpha acids from the resin prior to isomerization, but rather isomerizes them first and then relies on their greater acidity to remove them from the other hop resins. In spite of this, he does not achieve purities of isoalpha acids equal to that achieved by the simple procedure of this Example.

EXAMPLE 5

The Effect of Using More Dilute Alkali, and a Comparison of Sodium and Potassium Hydroxide.

A three percent (3%) solution of either potassium or sodium hydroxide is stirred with a CO2 hop extract liquified with sufficient heat, as in the previous Examples. However, because of the relatively dilute alkali, titration by measuring pH directly with the electrode is effective, and the titration is stopped at a pH of 8.4 to 8.6 to secure pure alpha acid, which is present as a solution at approximately 12% in the potassium, and at 17% in the sodium, aqueous phases. Further alpha acid can be obtained by further titration, and suitable backwashing with beta-free non-acidic resin as shown elsewhere in the Examples.

Accordingly, the practical ranges for alkali concentration in the separation step are from about 3% to 15%, although from 6% to 11% is the preferred range, and in terms of cost of equipment, it is expected that about 7% will be found most practical. This range is also optimal for conversion to isoalpha acids in the optional second step of the process, inasmuch as the acid form as well as basic form of the alpha acids is present at this level, and the pH drops during isomerization, thereby preventing formation of humulinic acid. Additionally, the higher concentration of alpha acid, at least about 15% and usually above—about 20 to 25%—appears to expedite the isomerization without byproduct formation, a very unexpected phenomenon which is contrary to the rules of organic chemistry which teach that reactions proceed more cleanly in dilute solutions.

EXAMPLE 6

A Preferred Embodiment using Sodium Hydroxide and Countercurrent Extraction.

1. Extraction was performed on seventeen (17) g of subcritical $CO_2$ hop extract, which assayed 38.6% alpha and 20.6% beta acids by the official spectrophotometric method of the American Society of Brewing Chemists. It was warmed to 45° C. to make it fluid. Initially, 11.25 ml. of 6% NaOH (0.94E) were added and agitated, and the lower aqueous phase separated. This weighed 15.3 gms., assayed 35.8% alpha acids, and therefore contained 5.5 g of alpha, and was free of beta acids. Upon dilution in water, it had a pH of 9.07. It was isomerized under (3) below.

The resin phase was reextracted with 1.75 ml of 6% NaOH to remove traces of alpha acids, whereupon 4.24 g were recovered assaying 61% alpha acids and containing a few percent beta acids. This fraction was added back for reextraction in (2) below.

The beta acids were removed by the addition of 7.75 ml of 6% NaOH, which was an excess, and 11.80 g of product was recovered assaying 3.10 g of beta acids (26% beta acids).

The non-acidic fraction, devoid of alpha and beta acids and having a typical hop aroma, weighed 2.38 g.

2. An additional seventeen (17) grams of the $CO_2$ hop extract and the 4.24 g of intermediate fraction were mixed, whereafter 10.25 ml of 6% NaOH (0.45E) were stirred into it at a temperature of about 45° C. The alpha acid fraction was separated, weighed 18.8 g, and assayed 37.4% alpha acids, representing 6.9 g of alpha acids. Upon dilution in water, it had a pH of 9.97.

The resin fraction was reextracted with three (3) ml of 6% NaOH to yield 12.64 g, assaying 43% alpha, or 5.4 g of alpha. It contained a few percent of beta acids, due to the higher pH.

This result of a lesser yield on the first extraction, and a greater yield on the second extraction, also demonstrates the need to allow sufficient time for the first extraction to separate, as in the second case it separated after seven minutes, whereas in the first extraction it separated only after fifteen minutes. Upon countercurrent extraction with more extract, all of this alpha can be recovered in pure form.

The remainder of the beta acids were extracted from the non acidic resins with three (3) ml of 6% NaOH, recovering 5.5 g assaying 27% beta acids, thus yielding 1.5 g of beta acids. 3. For isomerization, both of the pure alpha acid fractions were backwashed with the non-acidic resin, from which the beta acids had been removed, to remove entrained materials. They were then placed in an autoclave under five lbs. pressure for 1.75 hours to isomerize. The pH of the alpha acids produced under (1) fell from 9.07 to 8.64, and the pH of those made under (2) fell from 9.97 to 8.86. They contained no beta acids by TLC analysis, neither did they contain any humulinic acid, which is detectable by TLC at the 1% level. Both products were superior in purity to products which are presently commercially available.

Alternatively, these essentially pure alpha acid fractions are suitable for making the dihydroisohumulones of Westerman but, because of their high purity, they do not require the further partitioning and purification, with substantial loss of yield, necessitated by his procedures.

This Example demonstrates the unexpectedly fine separation of alpha acid, the ease of separation of beta acid, and the direct isomerization of the recovered alpha acid to a superior isohumulone. All of these results are unexpected, both qualitatively and quantitatively and with regard to ease of manipulation.

This Example further demonstrates clearly the unexpectedness of this invention, as well as its efficacy over the prior art. As mentioned above, the prior art uses dilute aqueous solutions of hop resins during the process of purification of the alpha and isoalpha acids, as it is well known that partitioning between solvent systems is more efficient and cleaner in dilute solutions. In the case of this invention, the reverse is exactly the case. That an exceptionally pure alpha acid and isohumulone, devoid of beta acid, can be made by this simple partitioning directly from the extract, without solvent, is contrary to theory and totally unexpected. Likewise, it is known that reactions, including isomerization reactions, are preferably carried out in as dilute a solution as possible. This is also in accord with the prior art practice for isomerizing alpha acids. In the present invention, a concentrated solution of alpha acids is directly isomerized, without catalyst, and the product contains undetectable, if any, amounts of impurities. This is also unexpected and represents a significant improvement over the prior art.

EXAMPLE 7

Flavoring of Beer According to the Invention.

Although many variations will be obvious to one skilled in the art, the preferred embodiment of this invention is to add the non-acid resins to the kettle during the boiling of the wort, so that the non-acidic flavors of hops will be present in the beer in the same proportions as would be the case had the parent $CO_2$ extract been used. For example, if the $CO_2$ extract is 30% non-acidic resins, and is added at a level of 200 ppm to the wort, the non-acidic resins would be added at 60 ppm to the wort.

Following fermentation, and prior to final filtration, the isoalpha acids made according to the invention, e.g., according to Example 6, are introduced into the beer to the desired level. Typically, if the extract is 40% alpha and the utilization of the extract 25%, the level of addition is 200 ppm to give 20 ppm of isohumulones in the beer. At a typical utilization of 85% for the isohumulones, 23.5 ppm is added to the beer by appropriately metering an aqueous solution of the isohumulones into the beer stream.

Following addition of the isohumulone and final filtration, the beer is held and packaged in its normal manner.

It should be noted that, in this typical example, if the extract itself is to be used, 80 ppm of alpha acids are used. If the alpha is converted to isoalpha acids according to the present invention, 23.5 ppm are used. The gain in efficiency is more than threefold.

EXAMPLE 8

Beer Variation.

If a light-stable beer is desired, the non-acidic fraction, which is devoid of alpha acids, can be added to the wort as in Example 7 to give the beer hop aroma, and then a light-stable isohumulone can be added such as described in U.S. Pat. Nos. 3,552,975 and 3,923,897. Such isohumulone can readily be made from the beta acids which are a byproduct of Example 1.

EXAMPLE 9

Variation—Use of Edible, Water-Soluble Organic Alcohol in the Separation Step.

A separation of alpha, beta, and non-acidic fractions from a $CO_2$ hop extract was performed as in Example 6, except that propylene glycol was present in the 6% NaOH to a concentration of 15% thereof. The results were the same in each case, except that a trace of beta acids was found in the isoalpha acids as a result of slightly poorer separation. The product was nevertheless entirely comparable to commercially available materials. Ethanol or glycerine, when substituted for the propylene glycol, produced the same result. The upper limit on the water-soluble edible alcohol is set by the impairment of the separation, and 22% is arbitrarily set as an upper practical limit.

Although not a preferred form of the invention, this Example is included to illustrate the alternative in which nonessential ingredients or components are added without detracting from operativeness of the invention.

EXAMPLE 10

Preparation of Hydrogenated Isohumulones, including Hexahydroisohumulone, from Beta Acid Fraction.

The beta acids recovered from Example 6 were recrystallized crystallized from hexane. One (1.0) g of the beta acids, fifteen (15) ml of methanol, one (1.0) ml of concentrated hydrochloric acid, and 0.35 g of 5% palladium on charcoal were placed in a hydrogenation vessel and agitated until hydrogen uptake ceased. The catalyst was filtered from the liquid, which was added to water. The water was extracted with methylene chloride, which was subsequently evaporated to remove both it and traces of methanol. To the 4-desoxyhumulone thus recovered, ten (10) ml of methylene chloride was added, the mixture cooled to 0° C., and 0.6 g of 40% peracetic acid dissolved in five (5) ml of methylene chloride was added over a two-hour period. The mixture was agitated at 0° C. for an additional two hours, twenty (20) ml of water was added, agitated, and separated. The methylene chloride solution of tetrahydroalpha acids was reextracted twice with water to remove the last traces of acetic acid, ten (10) ml of water and 0.25 ml of 12% sodium borohydride in 40% sodium hydroxide was added, the mixture brought to 70° C. with evaporation of the methylene chloride, held there three hours, and cooled. Hexane was added, the mixture acidified, and the hexahydroisohumulone (0.55 g) was recovered from the hexane by removing the hexane under vacuum. Alternatively, the tetrahydrohumulone is converted to tetrahydroisohumulone in the same manner as the humulones (alpha acids), using less than one equivalent of base.

This alpha acid fraction is suitable for making the dihydroisohumulone according to the procedures of Westerman, but because of its purity does not require the extensive clean-up steps nor encounter the yield losses experienced in his procedures.

EXAMPLE 11

Comparative vs. Baker Procedure

A comparative example, using the four equivalents of potassium ion shown by Example 1 of Baker U.S. Pat. No. 4,247,483, was performed using pure alpha acids. A starting 1.50 g of alpha acids, 1.15 g of $K_2CO_3$ (four equivalents), and 14 ml. of water were boiled in an oil bath for one hour, at the end of which isomerization had taken place. The pH increased, as predicted, from 9.8 to 10.1. Thin layer chromatography showed significant levels of humulinic acid to be present.

EXAMPLE 12

Isomerization of the alpha acid in the presence of the remainder of the hop extract.

To 318 gms. of carbon dioxide extract, containing about 50% alpha acids, was added 8.7% KOH to a pH of 9 at 55° C. with agitation. The mixture was agitated and then isomerized by heating to 100° C. for nine hours in the absence of air, placed in a separatory funnel, and allowed to cool overnight. In the morning, the lower aqueous layer, consisting of about 50% isohumulones in water at a pH of 7.3, was separated.

By HPLC, it contained 1.3% humulinic acid as a percent of isohumulone, as compared to 2.0% for that made from the same extract according to Example 2. Upon dilution with water to a concentration of 30% isohumulones, adjustment of pH to 9.0, and cooling, some beta acids sank to the bottom of the liquid, which could be removed by decantation from these traces of beta acids. However, the isohumulone preparation containing the trace of beta acids was acceptable for post-fermentation addition to beer (although residual beta acids can be removed by simple physical means such as decantation). This is a surprising result, since it means that the hop waxes, lipids, and other saponifiables, as well as the unstable terpene myrcene, are not affected under the conditions of the invention, nor are the other hop acids or essential oils degraded. Indeed, they appear to reduce the formation of humulinic acid. This is important to the efficacy of this invention.

These results should be contrasted with those of Baker U.S. Pat. No. 4,247,483, who depends upon the use of more than an equimolar amount of aqueous base to effect isomerization with rise in pH. This results in two phases, an aqueous phase and an aqueous oily phase, one being richer in isohumulone than the other. His richer phase contains less impurities in relation to isohumulones (Table 3), the humulinic acid being 2.3% in the richer oily phase, and 5.3% in the more dilute aqueous phase. This is to be contrasted with the 1.3% of humulinic acid obtained as an impurity in the foregoing Example.

EXAMPLE 13

Purification of hop resin containing polyphenols and other polar water-soluble materials, and subsequent isomerization.

Comparative example with Humphrey U.S. Pat. No. 4,302,479, Lance U.S. Pat. No. 4,395,431, and Laws U.S. Pat. No. 4,298,626.

The prior art shows how to remove substances which interfere with obtaining a pure isohumulone from a carbon dioxide extract of hops, under the isomerization conditions known to the art. Apparently hop polyphenols, fatty acids, sugars, waxes, etc., as well as beta acids, make isomerization and purification of the isohumulone difficult. All of the prior Examples of this application, including those in which the alpha acids were separated from the extract prior to isomerization, provided isohumulones with superior purity without any purification steps. Nevertheless, from time to time, either because there is a great deal of water in the hops or in the carbon dioxide, or because a cosolvent such as ethanol is used with the carbon dioxide, the extract may contain substances such as polyphenols and other watersoluble substances which are not desired in the beer. These may be removed by simple water washing of the extract, as in this Example.

A further observation should be made. If, in any of the Examples, the extract contains substantial amounts of water, the concentration of base should be increased so as to effect an isohumulone concentration in the aqueous phase of no less than about 30% at the end of isomerization, or phase separation will be difficult. Furthermore, if for any reason the extract contains lower fatty acids, these are preferentially removed by base extraction prior to isomerization, as they will carry through into the isohumulone phase and then be separable only with greater difficulty, as well as require an increase in the amount of base necessary during the isomerization step.

In this Example, the $CO_2$ extract of Example 12 containing about 50% of alpha acids was enriched by the addition of hop polyphenols and other water-soluble constituents obtained by extraction from a water extract of hops, from which the resins were removed with hexane, to the extent of 3% w/w. The use of a water extract of spent hops was for the purpose of adding a known amount of the extractables which Laws would expect with water present in the carbon dioxide, a problem which is ubiquitous because hops also contain water.

168 gms. of this impure extract were agitated at 60° C. with 25 ml of 5% NaCl solution, the pH being 3.4, and this salt water extraction repeated once to remove all watersoluble impurities. The combined aqueous phases were then assayed for alpha acids (0.73% of original alpha acids were lost to the aqueous phase), and then dried. After allowing for the salt, 5.15 gms. of hop water solubles including added impurities were recovered (102%) and discarded. The purified $CO_2$ water-insoluble hop extract, comprising the desired hop resins including the alpha acids, was then isomerized as in Example 12 using 8.7% aqueous KOH with the same excellent result.

Modifications along the lines of Example 6 are evident and can also be made in the procedure of this Example if desired.

Humphrey depends on agitation of the hop extract dissolved in a water-immiscible solvent such as limonene, at a pH of below 1, to remove the water solubles, and isomerizes with excess base in U.S. Pat. No. 4,302,479, or with catalyst in U.S. Pat. No. 3,875,316. Laws defines very critical limits to the water content and pressure and temperature of extraction to minimize the presence of these impurities during isomerization and in the resulting product. (See Col. 4, Table 3.) Lance depends upon adsorbing the hop resins on an adsorbent, binding the isohumulones with magnesium, and then re-extracting the impurities to provide a pure isohumulone preparation.

The novelty of the present process, which depends on the use of less than about an equivalent of base and a pH not greater than about 10 during isomerization, obviates all of these complexities, and is clearly an improvement in the art. As illustrated, it can be conducted in a single step using the total $CO_2$ hop extract without prior isolation of the alpha acids and without further purification of the resulting isohumulone (isoalpha acids).

In conclusion, from the foregoing, it is apparent that the present invention provides a novel process for separating the components of a CO2 hop extract using only natural reagents and/or conditions, and if desired totally free of artificial ingredients or contaminants, involving also a novel isomerization of alpha acids to isoalpha acids using natural and non-contaminating procedure, as well as novel alpha acid and beta acid fractions derived from hop CO2 extract by the process of the invention and the utilization thereof directly, or in the form of derivatives thereof, in the flavoring of beer, all having the foregoing enumerated characteristics and advantages.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope of the appended claims.

I claim:

1. A beer flavored with a liquid, stable, resinous essentially non-acidic hop flavor fraction which is essentially devoid of alpha- and beta-acids.

2. A light-stable beer flavored with a liquid, stable, resinous essentially non-acidic hop-flavor fraction which is essentially devoid of alpha- and beta-acids.

* * * * *